(No Model.)

W. M. PUGH.
COMBINED ROLLING PIN AND DOUGH CUTTER.

No. 565,635. Patented Aug. 11, 1896.

Witnesses,
F. W. Woerner,
L. A. Minturn

Inventor,
William M. Pugh,
By Joseph A. Minturn
ATTORNEY.

THE NORRIS PETERS CO., PHOTO-LITHO., WASHINGTON, D. C.

UNITED STATES PATENT OFFICE.

WILLIAM M. PUGH, OF INDIANAPOLIS, INDIANA, ASSIGNOR OF ONE-HALF TO EDWARD PFEIFFER, OF SAME PLACE.

COMBINED ROLLING-PIN AND DOUGH-CUTTER.

SPECIFICATION forming part of Letters Patent No. 565,635, dated August 11, 1896.

Application filed February 21, 1896. Serial No. 580,163. (No model.)

*To all whom it may concern:*

Be it known that I, WILLIAM M. PUGH, a citizen of the United States, residing at Indianapolis, in the county of Marion and State of Indiana, have invented certain new and useful Improvements in a Combined Rolling-Pin and Dough-Cutter; and I do hereby declare the following to be a full, clear, and exact description of the invention, such as will enable others skilled in the art to which it appertains to make and use the same.

The object of this invention is to provide an attachment that can be slipped onto a common rolling-pin and used for cutting dough into cakes preparatory to baking, the purpose being to provide means whereby the dough can be cut more rapidly and with less effort than by means of the cutter now employed for domestic use.

I accomplish the objects of the invention by the mechanism illustrated in the accompanying drawings, in which—

Figure 1:
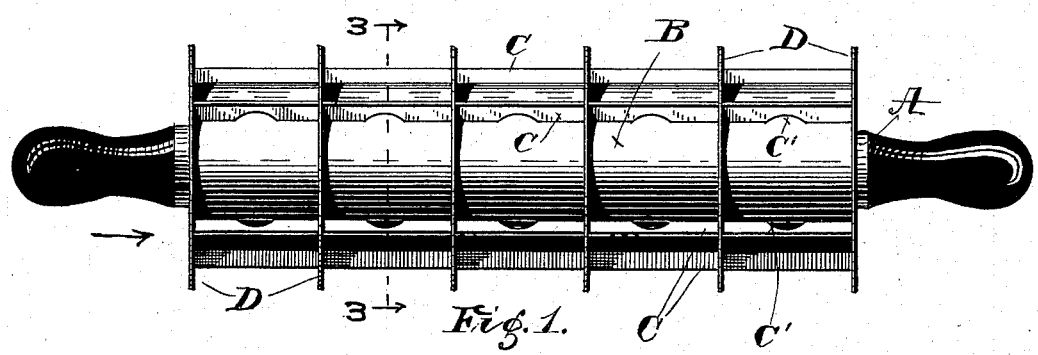
Figure 2:
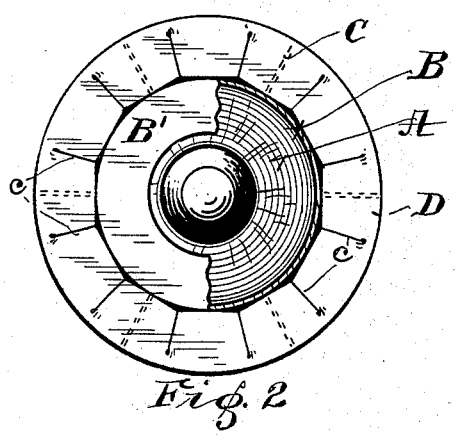
Figure 3:
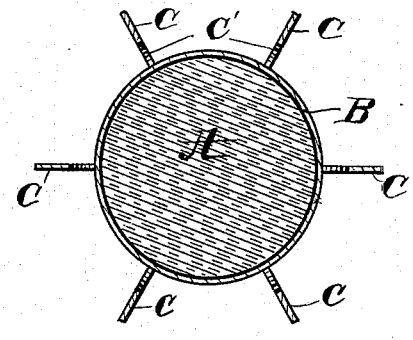

Figure 1 is a view in side elevation of my improved cutter applied to a rolling-pin. Fig. 2 is an end view looking in the direction of the arrow in Fig. 1, and Fig. 3 is a detail in cross-section on the line 3 3 of Fig. 1.

Similar letters of reference indicate like parts throughout the several views of the drawings.

A is a rolling-pin of usual construction, such as is commonly used in private families.

B is a cylinder, preferably of tin, made so as to slip over the roller and make a close fit therewith. One end of the cylinder will be open and unobstructed, but the other end will have an inside flange B', Fig. 2, to contact with the end of the roller and enable the cylinder to be held, by the pressure of the operator's thumb, from longitudinal displacement on the roller.

C are longitudinal strips of sheet metal, of any suitable number, depending on the size of the biscuits or cakes to be cut, and are soldered to the outer face of the cylinder in the manner clearly shown in Fig. 3. Notches C' for the purpose of admitting air to the compartments of the cutter are provided.

D are annular strips, which are also soldered to the cylinder and divide the surface up into sections of the required size. These strips will preferably be made out of tin and will be equal in width to the strips C.

In order to economize in material, I will prefer to use longitudinal strips, which will be notched on one side at frequent intervals and a sufficient portion of the metal removed to enable the strip to be bent edgewise into a flange in the manner as shown in Fig. 2, in which *c* represents the cuts made to facilitate the bending.

The cutter shown in the drawings represents a square pattern, by means of which biscuits or cakes square in outline will be produced.

I do not wish to limit this invention to the square pattern or to a pattern of any specified form, as it is quite apparent that many different forms might be used without departing from the spirit of this invention.

The practical operation is as follows: The dough is rolled to the proper thinness with the rolling-pin. Then the cutter is slipped on over one end of the roller and the roller, with the applied cutter, is rolled over the dough, by which operation the dough is cut in a single passage of the roller.

Having thus fully described my invention, what I claim as new, and wish to secure by Letters Patent of the United States, is—

The combination with the rolling-pin of a cylinder B to fit over the roller and having the end flange B', a plurality of longitudinal strips C with notches C' for the purposes described and the annular strips D, all substantially as described and specified.

In testimony whereof I affix my signature in presence of two witnesses.

WILLIAM M. PUGH.

Witnesses:
   JOSEPH A. MINTURN,
   F. W. WOERNER.